(12) United States Patent
Spires

(10) Patent No.: US 6,636,847 B1
(45) Date of Patent: Oct. 21, 2003

(54) EXHAUSTIVE SEARCH SYSTEM AND METHOD USING SPACE-FILLING CURVES

(75) Inventor: Shannon V. Spires, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 376 days.

(21) Appl. No.: 09/608,335

(22) Filed: Jun. 29, 2000

Related U.S. Application Data

(60) Provisional application No. 60/142,189, filed on Jul. 1, 1999.

(51) Int. Cl.[7] .............................................. G06F 17/30
(52) U.S. Cl. ..................... 707/3; 707/2; 707/4; 707/10
(58) Field of Search .............................. 707/2, 3, 6, 10; 706/45, 4

(56) References Cited

U.S. PATENT DOCUMENTS

| | | | |
|---|---|---|---|
| 5,543,935 A | 8/1996 | Harrington | |
| 5,602,943 A | 2/1997 | Velho et al. | |
| 5,855,433 A | 1/1999 | Velho et al. | |
| 6,233,367 B1 * | 5/2001 | Craver et al. | ............... 382/305 |

OTHER PUBLICATIONS

Hert et al., "A Terrain–Covering Algorithm for an AUV," Autonomous Robots, 3:91–119, 1996.

Choset and Pignon, "Coverage Path Planning: The Boustrophedon Cellular Decomposition," International Conference on Field and Service Robotics, Canberra, Australia, 1997, also available at http://voronoi.sbp.ri.cmu.edu/~choset.

Kurabayashi et al., "Cooperative Sweeping by Multiple Mobile Robots," 1996 IEEE International Conference On Robotics and Automation, pp. 1744–1749, 1996.

Goldsmith and Robinett, "Collective Search by Mobile Robots Using Alpha–Beta Coordination," Collective Robotics Workshop '98, Agent World, Paris, 1998.

Bially, "Space–Filling Curves: Their Generation and Their Application to Bandwidth Reduction," IEEE Transactions on Information Theory, V 15 No 6, pp. 658–664, Nov. 1969.

Faloutsos and Roseman, "Fractals for Secondary Key Retrieval," Eighth ACM SIGACT–SIGMOD–SIGART Symposium on Principles of Database Systems (PODS), pp. 247–252, Philadelphia, PA, Mar. 29–31, 1989.

Kamel and Faloutsos, "Hilbert R–tree: An improved R–tree using fractals," Proc. of VLDB Conference, pp. 500–509, Santiago, Chile, Sep. 12–15, 1994.

Spires and Goldsmith, "Exhaustive Geographic Search with Mobile Robots Along Space–Filling Curves," Proceedings of Collective Robotics Workshop 1998, Paris, France, published as Lecture Notes in Artificial Intelligence vol. 1456, Springer–Verlag, pp. 1–12, ISBN 3–540–64768–6, Jul. 4–5, 1998.

Sagan, Space–filling Curves, Springer–Verlag, New York, ISBN 0–387–94265–3, 1994.

* cited by examiner

Primary Examiner—Wayne Amsbury
Assistant Examiner—Marcin Filipczyk
(74) Attorney, Agent, or Firm—Robert D. Watson; Suzanne Rountree

(57) ABSTRACT

A search system and method for one agent or for multiple agents using a space-filling curve provides a way to control one or more agents to cover an area of any space of any dimensionality using an exhaustive search pattern. An example of the space-filling curve is a Hilbert curve. The search area can be a physical geography, a cyberspace search area, or an area searchable by computing resources. The search agent can be one or more physical agents, such as a robot, and can be software agents for searching cyberspace.

25 Claims, 4 Drawing Sheets

EXHAUSTIVE SEARCH SYSTEM AND METHOD USING SPACE-FILLING CURVES

This application claims the benefit of U.S. Provisional Application No. 60/142,189, filed Jul. 1, 1999, incorporated herein by reference.

This invention was made with Government support under Contract DE-AC04-94AL85000 awarded by the U.S. Department of Energy. The Government has certain rights in the invention.

BACKGROUND OF THE INVENTION

This invention relates to the field of search control systems and more particularly to exhaustive search systems and methods using space-filling curves.

When one or more search agents are controlled to exhaustively search an area, the search system must guarantee coverage of the entire search area in a finite amount of time. Optimally, multiple search agents can search an area in less time than one search agent. But, the use of multiple agents can be inefficient to coordinate, can have overlapping search regions, and can require re-coordination if one or more agents fail. This results in a need to provide coordination among multiple autonomous or semi-autonomous cooperating agents without sacrificing efficiency or imposing an undue agent-to-agent communication burden.

One area that is particularly applicable to multiple agents is exhaustive geographic search, or source mapping, requiring development of a complete map of all phenomena of interest within a defined geographic area, subject to the engineering constraints of efficiency, robustness, and accuracy.

Examples of a need for an exhaustive search of a geographic area include using multiple robots to locate all buried mines within a specified geographic region and using one or more robots to cover a region for some other purpose like mowing or fertilizing. It can be possible to build a robot that has the requisite sensors and navigation apparatus to do mine searches, thus removing humans from an extremely high-risk activity. But a single robot can be expensive and subject to damage from mines, rendering it useless. If less expensive robots could be built in quantity, it could be better to build a swarm of such robots that could cooperate to locate all the mines within a given geographic region. A three-dimensional geographic area can be searched in water by multiple undersea robot swimmers, in air by flying robots, and on land by climbing robots.

Pseudo-geographical searches of an n-dimensional space include software agent searches of cyberspace (for example, searches over a network of interconnected computers to locate all information matching a specified search criterion, general computer searches in a multiprocessing environment, and database searches across one or more network databases).

Search Systems

Hert et al. and Choset and Pignon teach obstacle avoidance but do not teach efficient coverage with multiple robots or robustness. See Hert et al., "A Terrain-Covering Algorithm for an AUV," Autonomous Robots, 3:91–119, 1996; and Choset and Pignon, "Coverage Path Planning: The Boustrophedon Cellular Decomposition," International Conference on Field and Service Robotics, Canberra, Australia, 1997, also available at http://voronoi.sbp.ri.cmu.edu/~choset.

Kurabayashi et al. teaches multiple-robot sweeping but does not teach distributed control and robustness. See Kurabayashi et al., "Cooperative Sweeping by Multiple Mobile Robots," 1996 IEEE International Conference On Robotics and Automation, pp. 1744–1749, 1996.

Goldsmith and Robineff teach an information-exploitive search algorithm for precise localization of a target source within a given region using risk-taker alpha agents and conservative beta agents communicating under a decentralized coordination strategy called alpha-beta coordination. Goldsmith and Robinett do not teach an exhaustive search algorithm with guaranteed coverage of the entire search area in a finite amount of time. See Goldsmith and Robinett, "Collective Search by Mobile Robots Using Alpha-Beta Coordination," Collective Robotics Workshop '98, Agent World, Paris, 1998.

Exhaustive Search

Search applications exist where there is no a pror knowledge of the locations of a search target. One example application given previously is in searching for target mines within a given geographic region. Similarly, in another example search application, a cybersearch over a network of one or more interconnected computers can seek out the locations of target information without a piori knowledge of information location.

When numerous search agents are used in exhaustive search applications, each agent and the distributed search system for each agent needs to be efficient and robust, and the entire set of search agents needs to guarantee search coverage of the search area. If a search agent cannot complete its search task or if it cannot communicate completion of its search task, the search system needs to reliably detect such a condition and robustly compensate for the failure while completing the exhaustive search task in a finite amount of time. Searching by spiraling outward in a geographic search can guarantee coverage of the search area in a finite amount of time, but using more than one search agent cannot necessarily decrease that time. Searching by a random walk cannot even guarantee coverage in a finite amount of time. It can be inefficient to perform a random walk with robots because: there is no guarantee that a random walk for a robot does not retrace own path, no guarantee exists that the random walk will not cover ground covered by a neighbor, and no guarantee exists that the random walk can finish in a finite amount of time.

Exhaustive search applications result in a need for a search controller that is efficient, robust, and provides guaranteed search area coverage in a finite amount of time. Accordingly, there is an unmet need for a search system suitable for one or multiple search agents that can be used where an guaranteed exhaustive area search is required to be performed in a finite amount of time and which requires little or no communication or re-coordination if a search agent dies or becomes defective.

SUMMARY OF THE INVENTION

The present invention provides a search system suitable for controlling one or multiple agents to search an area utilizing a locator and a search controller, generating an exhaustive search pattern for the search area comprising a space-filling curve along which the agent travels. The search area can comprise a physical geography or a cyberspace search area. Robotic vehicles and software agents are both suitable for use with the present invention.

The present invention teaches a new search method for controlling a single agent or multiple agents to exhaustively search an area according to a space-filling curve. The search method utilizes input from a locator and searches the area until a termination condition is met.

BRIEF DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

Figure 1:
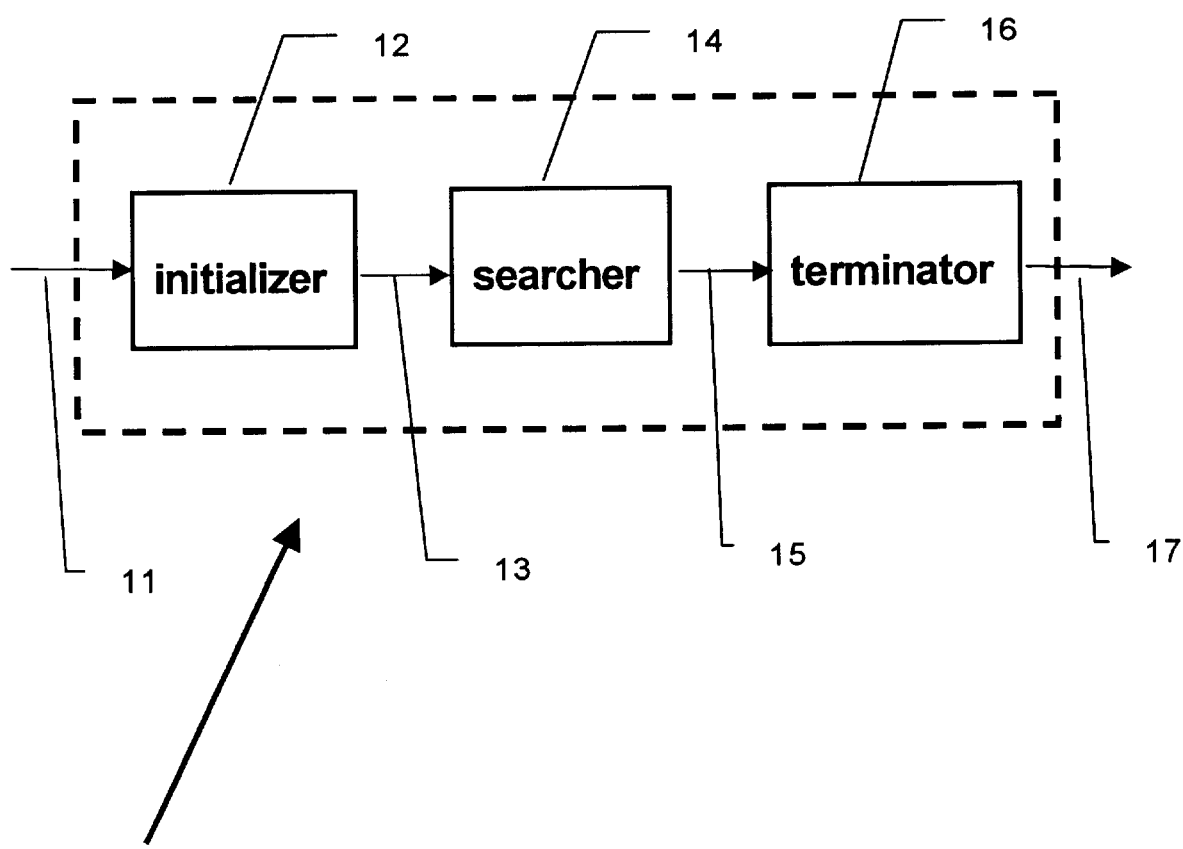
FIG. 1 is a diagram depicting a search controller according to the search system of the present invention.

This invention provides a search system suitable for controlling one or multiple agents to search an area utilizing a locator, a search controller, and an exhaustive search pattern for the search area comprising a space-filling curve. The search area can comprise a physical geography or a cyberspace search area. Robotic vehicles and software agents are both suitable for use with the present invention. The search controller can include a computer, a memory accessible from the computer, and a program stored in the memory that implements a search algorithm on the computer.

"Search" is defined as any coverage of any given space of any dimensionality, where "coverage" is defined as complete traversal of a given space of any dimensionality. "Search" includes looking (for example, as in searches using robots or software agents) and traveling through an area and leaving/removing something (for example, as in applying paint or fertilizer to a surface, robotic lawn mowing, golf course maintenance, swimming pool cleaning, and earth moving/clearing as with a fleet of bulldozers). A sensor radius indicates a limit of individual coverage (for example, a swath size or an agent coverage size). A search area includes a 2-dimensional or 3-dimensional physical space as well as an abstract space of any dimensionality, as in a cyberspace search of a computer memory or a network cyberspace. An agent includes: search agents and coverage agents used in searches as defined above, as well as software agents, cyberspace agents, robots, and combinations of the above. Consistent with the above definitions, an exhaustive search pattern works for both search and coverage.

When a search agent includes multiple autonomous vehicles, reducing the size and expense of on-board compute resources improves cost effectiveness. Locators can comprise an initial position identifier and a target sensor. Inexpensive locators can have limited sensor range. With suitable programming, many robots could do the job faster than one (ideally in 1/m the time, if m robots participate in the search). The search process would be more robust because if a robot is damaged (e.g., by a mine), other robots could take over its work.

The search system of the present invention can be used in varying applications. It can be used in searching a field for mines. It can also be used in a hostile battlefield, for example, to identify enemy soldiers (stationary or mobile) or a sniper. In a military application, robots can perform the search and can search for mines, soldiers, snipers, or any other targets of interest. The present invention can be used for cyberspace searches over a network of one or more computers. For example, software agents can be analogous to robots and a cyber space of interconnected computers analogous to the physical field of the previous example. The present invention can be used to search an information cyberspace by multiple agents (for example, a parallel search on one or more computers) in a coordinated manner, rather than one software agent doing the search alone.

Exhaustive Search Using Space-Filling Curves

The objective of a search agent can be to search for one or more targets without a priori knowledge of the locations of the targets. The mission can be to identify the is total number of targets within a search area, the target locations, and additional characteristics (for example, a chemical signature for hazardous wastes, an explosive signature for a mine, or an address for a cyber search). The search can be used with one or more agents.

Each search agent has a locator, which can comprise an initial position identifier and a sensor for detecting targets of interest. The sensor can have a limited range that can be much smaller than the overall search area. Agent sensors can have the same sensor range, or agents can be made aware of the minimum sensor range for other agents. An alternate embodiment can utilize agent sensors with different ranges to enhance exhaustive search parameters.

Communication can be minimized and used only at initial configuration and when an agent encounters a neighbor agent's starting position and communicates an "all done" signal. Therefore, RF emissions can be reduced for non-detection in military applications. An agent can learn the neighbor agent's starting position, for example, by memorizing the initial position during the initial configuration communication or by having each agent drop a marker or token at its own starting position. RF communication can be unnecessary in the latter approach; and the marker can be a silent form of communication where an agent "sniffs" for the dropped marker or token. For example, in a "sniffing" communication, a marker dropped at the beginning of an agent's path signals its follower agent to stop, and a marker dropped at the end of the agent's path signals its predecessor agent that it did not die. If each agent is programmed to drop markers at its starting and ending positions and if each agent returns to its starting position, then the absence of the follower agent's ending token at the agent's starting position tells the agent that it must search the follower agent's space.

When all agents have communicated the "all done" signal, the agent collective can know the region has been exhaustively searched. If one or more agents cannot report in by some time limit (which can occur at the same time as the following agent's "all done" signal), the following agent can unilaterally decide (with no need for further communication from the collective) to search the dead agent's area. If all communications fail (for example, through RF jamming) the worst case search can take as long as a search with a single agent, with each agent searching the entire area until it reaches its own starting position. The search is guaranteed to complete as long as one agent is alive.

When sensor inputs are uncertain or in cases where navigational errors might leave areas uncovered, agents can proactively continue to search within their neighbor agent's search area, even if the neighbor agent does not die. Because such an approach means areas are covered more than once, it can effectively raise the signal-to-noise ratio of noisy sensors, for example.

Control of the agents can be decentralized with no central coordinating entity. Each agent can cooperate through minimal communications to other agents and can function autonomously. Isolated agents can perform useful work. Each search agent can reliably communicate with the other agents with some probability $P_c$. The search mission can be completed even as $P_c$ approaches zero, although the search can take longer. Each search agent can determine when its job is finished and can communicate an "all done" signal to the other agents. Communication can be by conventional wireless means (e.g., RF, optical, or sonic) or by the aforementioned markers or tokens.

All agents can proceed along the same path, along the same space-filling curve but at different positions. The exhaustive search can use a space-filling curve to convert from n-dimensional space to one-dimensional (or linear) space and to fill a search space with a curve (fractal). The search can use a Hilbert space-filling curve. Each search agent can have an individual search sub-area, not overlapping the search sub-area of another agent. All agents can remain within the bounds of the search area, and the union of their search sub-areas can be the entire search area; hence the use of the term exhaustive search. In an alternate example, each agent can travel along a different space-filling curve, which can be advantageous in specific situations.

The search system can be robust. The search can be completed even if one or more agents dies or fails to complete its mission. In the search configuration of FIG. 3, where a space-filling curve is not used, the agents are represented as triangles and are programmed to march to the right, covering the entire search area. If one of the agents is defective or dies during the search, its strip of territory will not be searched. If the other agents can reliably detect the failure and if they can reorganize themselves, they can search the defective agent's strip. However, if the agents search along a path determined by a space-filling curve, they can topologically search in one dimension along the single path, simply depicted as a circular path in FIG. 4, without reorganizing. Although the path is topologically one-dimensional because a space-filling curve is used, the agents are actually moving in multi-dimensional space. In following a space-filling curve, each agent eventually can search the entire space. If one agent fails, the next agent behind can continue along its path without stopping and without reconfiguration. As long as one agent can continue the search, the search can complete and can be guaranteed to exhaustively cover the entire area, although it can take longer. The search can also be robust with respect to communication failures.

The search can be completed within a finite time. An agent can search until it reaches a neighbor agent's starting position, its own starting position, or any other identified position. As the number of search agents increases, the search time can decrease. Ideally, the search time t with one agent can be reduced to t/m for m agents, if all agents can be deployed equidistant from each other along the one-dimensional search path.

A search agent, for example a robotic vehicle, can have a finite energy supply, for example batteries or a fuel cell. In a worst case scenario, each agent can need enough energy reserves to search the entire space. In a best case scenario, each agent can need only enough energy reserves for 1/m of the entire space.

An exhaustive search system can be inherently collision-preventive, since each agent can follow the same path along a space-filling curve. Whenever several agents follow the same space-filling curve, theoretically there can be no chance of agents' geographic paths crossing and no need for dynamic collision avoidance, due to the automatic separation inherent in the algorithm. Realistically, obstacles, accumulated navigation errors, different agent speeds, or agent death on the path, can require some collision detection.

The search can be used in one-dimensional space, two-dimensional space, up to n-dimensional space.

The present invention can solve the entire problem set with de-centralized control (for example, no master robot, no master computer). See Spires and Goldsmith, "Exhaustive Geographic Search with Mobile Robots Along Space-Filling Curves," Proceedings of Collective Robotics Workshop 1998, Paris, France, published as Lecture Notes in Artificial Intelligence Vol. 1456, Springer-Verlag, Jul. 4–5, 1998, pp. 1–12, ISBN 3-540-64768-6, incorporated herein by reference.

Space-Filling Curves

A two-dimensional (or higher n-dimensional) coordinate of real space can be converted into a one-dimensional space-filling curve coordinate. Other algorithms convert from a one-dimensional coordinate back into a two-dimensional (or higher n-dimensional) coordinate. See Bially, "Space-Filling Curves: Their Generation and Their Application to Bandwidth Reduction," IEEE Transactions on Information Theory, V 15 No 6, November 1969, pp. 658–64.

Faloutsos and Roseman and Kamel and Faloutsos teach the use of space-filling curves for efficient indexing of geographical databases and to pre-index a geographical database (such as a geographic information system) to make it easy to make geographic associations. See Faloutsos and Roseman, "Fractals for Secondary Key Retrieval," Eighth ACM SIGACT-SIGMOD-SIGART Symposium on Principles of Database Systems (PODS), pp. 247–252, Philadelphia, Pa., Mar. 29–31, 1989; Kamel and Faloutsos, "Hilbert R-tree: An improved R-tree using fractals," Proc. of VLDB Conference, Santiago, Chile, Sep. 12–15, 1994, pp. 500–509.

A classical space-filling curve (or a fractal curve that in the limit becomes a space-filling curve) can be used to produce a search controller to divide the work of searching according to the present invention. A space-filling curve is a continuous path which passes through every point of a given n-dimensional region. Mathematically, a space-filling curve can visit every point in a space exactly once and never cross itself. The space-filling curve maps an n-dimensional space to a 1-dimensional space and often is self-similar using a repeating pattern. A conventional curve algorithm cannot fill space. See Sagan, Space-filling Curves, Springer-Verlag, New York, 1994, ISBN 0-387-94265-3.

Search Controller Using Space-Filling Curves

The present invention teaches a new search method for controlling a single agent or multiple agents to exhaustively search an area according to a space-filling curve. The search method utilizes input from a locator and searches the area until a termination condition is met.

In an example of the present method of controlling robotic vehicles, a space-filling or fractal curve can be used to control a search controller. Example space-filling curves can include a Hilbert curve and a Hilbert II curve. See Spires and Goldsmith.

The search example utilizing a space-filling curve allows multiple robots to cooperate in an efficient and robust search. Exhaustive coverage of a one-dimensional path with multiple robots is substantially easier and more robust than coverage in two (or more) dimensions. An algorithm can transform a two- or three-dimensional geographic search task (or higher n-dimensional search in other examples) into a one-dimensional search, with the result that n-dimensions can be effectively searched with the attendant advantages of one-dimensional coverage. The transformation is accomplished by having robots divide and traverse a minimum-length space-filling curve.

A search system can comprise a computer and a program implementing a search algorithm on the computer. In an application where the agent is a robotic vehicle, the computer can be a low-cost microcontroller, for example, an 8-bit microcontroller, or other computer suitable for use on multiple agents.

FIG. 1 is a diagram depicting search controller 10 according to the search system of the present invention. Search controller 10 comprises initializer 12, searcher 14, and terminator 16, along with position input 11 from a locator, search pattern parameter 13, termination indicator 15, and search output 17.

Position input 11 can comprise an initial position for the agent. Initializer 12 can take position input 11, identify an extrema position of the search area, and determine search pattern parameter 13. Search pattern parameter 13 can be input to searcher 14. Searcher 14 can take search pattern parameter 13 and determine an exhaustive search pattern for the search area, according to a space-filling curve. In an alternate embodiment, the search pattern can be according to the algorithms given by Bially and can correspond to a Hilbert curve. Searcher 14 continues until a termination condition indicated by termination indicator 15 is met. The termination condition can be, for example, according to position (return to a neighbor's starting position), time (pre-determined time), and communication (completion signal). Termination indicator 15 can comprise a return to an initial agent position for an agent or for its preceding agent. Terminator 16 can determine if the preceding agent completed successfully and can cause the current agent to continue on the preceding agent's mission if the preceding agent did not complete successfully. When each agent's mission has been completed, each agent can communicate search output 17.

Search Control Process

Figure 2:
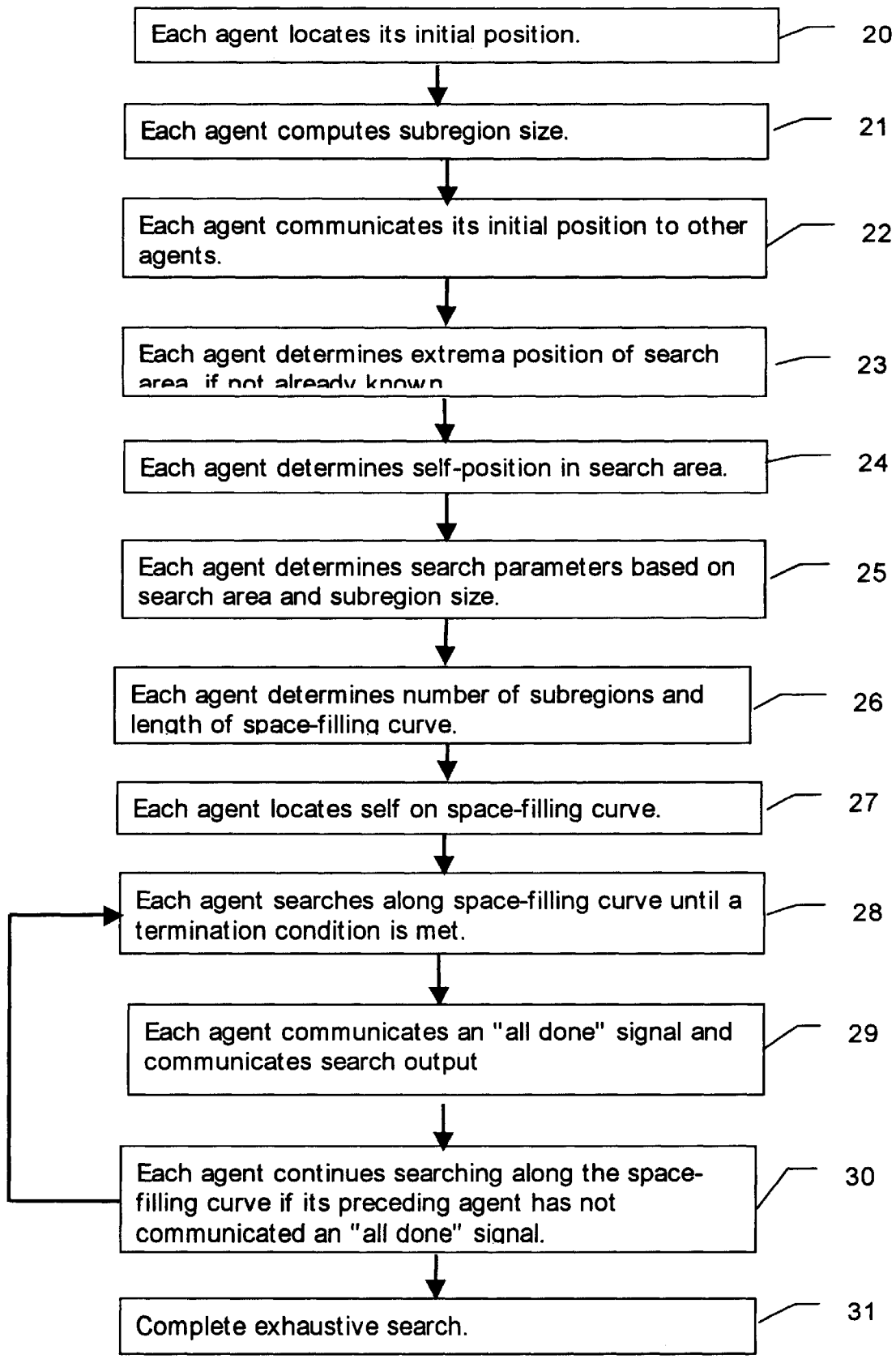
FIG. 2 is a flow diagram depicting an agent search system according to the present invention with an example of an exhaustive search method of controlling the agent.

FIG. 2 is a flow diagram depicting an agent search system according to the present invention with an example of an exhaustive search method of controlling the agent. The search depicts an exhaustive search for one agent or for a plurality of agents searching an area. The search system on each agent comprises a locator and a search controller.

The locator can comprise a target sensor and an initial position identifier to determine an initial position of a search agent. For this task, the initial position identifier includes those selected from the group of: inertial sensors, inertial position units, global positioning satellite (GPS) receivers, initial position identifiers, dead-reckoning, other indicators that give agent position, and combinations of the above. Examples of target sensors include, but are not limited to: chemical sensors, mine detectors, explosive sensors, keyword locators, topic identifiers, and other cybersearch tools. Means for determining the initial position, indicated by the locator, include implementation in software or hardware, pre-loaded information, sensed position, calculation of position, and combinations.

As in FIG. 1, the search controller comprises an initializer, a searcher, and a terminator. In one embodiment of the example method shown in FIG. 2, it can be assumed that the search area is square and that the search area bounds and individual sensor ranges are known by each robot a priori.

In FIG. 2, steps 20 through 27 are performed as part of the initializer. In step 20 of the process, each agent locates its initial position, if it is not already known. For example, each agent can be carefully placed in its initial position, in which case the initial positions already are known. As another example, each agent can be dropped from an aircraft and land in random positions. The position can be determined as an absolute position in n-dimensional space, or as a position relative to a search area.

In step 21, each agent independently computes a subregion size based on sensor range. Each agent can know its sensor range a priori and the sensor ranges of all other agents or can communicate the range information to the other agents. All agent sensors can have the same sensor range, or all agents can determine the minimum sensor range for all of the other agents. In order for each agent to compute the same subregion size, each agent can use the minimum sensor range. In another embodiment, each agent can have a different sensor range, compute a different subregion size, and follow a different space-filling curve.

In step 22, each agent communicates its initial position to all other agents, so each agent can know the starting positions of all the other agents. When the agent is a robotic vehicle, the communicator includes an RF device or other appropriate device for use on a robotic vehicle and having the capability to communicate information. When the agent is searching a cyberspace search area, the communicator can be any type of messaging device or shared memory area accessible by all search agents. If the search area and search bounds are known a priori or if each agent is assigned an initial starting position, step 22 can be omitted. In the latter example, initial communication is unnecessary and each agent can drop a token or marker at its starting position for use by a successor agent to know when to stop searching. In an embodiment where communication range is limited, use of the Hilbert curve is advantageous because the most important communication for a robot is with its nearest neighbors in one-space. The Hilbert curve tends to map points nearby in n-space to points nearby in 1-space. See Faloutsos and Roseman.

In step 23, each agent determines the extrema positions of the search area, or the boundary points of a convex hull, using available convex hull algorithms. The extrema position can be input to the initializer (for example, for a pre-determined search area) or can be derived from initial positions of all search agents taken together (where, for example, the extrema position identifies a convex hull search area of all the initial positions). The search area can be square-shaped and defined by extrema positions at opposite corners of the search area or defined by one extrema position and a distance, for example a diagonal. The search area can be circular-shaped and defined by a centerpoint and a radius. The search area can be triangular or any other shape determined by a convex hull. If the search area and search area bounds are known a priori or if each agent is assigned an initial starting position, step 23 can be omitted.

In step 24, each agent determines its own position relative to the search area (unless the relative position already was provided in step 20). In an example geographic search, the position is in a two- or three-dimensional space. In a pseudo-geographic search, for example a cyber or computer network search, the agent position is described in n-dimensional space.

In step 25, each agent determines a search pattern parameter based on the subregion size from step 21 relative to the overall search area. The search pattern parameter comprises a space-filling curve parameter (for example, the order, length, or size of a space-filling curve). Each agent can compute the same value for the order of the curve (for example, an order D for a Hilbert curve or a Hilbert II curve). The search space can be subdivided so that sensor range(s) exhaustively cover the search space while each robot follows the search path. A more sensitive search, for higher sensor reliability, is implemented by determining a search path covered by overlapping sensor measurements. In an alternate embodiment, the search pattern parameter is pre-computed and stored on an agent. In yet another embodiment, the search pattern parameter and other values (for example, extrema positions) are downloaded to an agent.

In step 26, each agent determines the number of subregions in the search area and the length of the search curve. For example, if a space-filling curve is used, the number of subregions and the length of the curve are computed according to:

$$\text{\# subregions} = \text{Length}_{curve} + 1. \qquad \text{Equation 1}$$

The space-filling curve can be a Hilbert curve. If a Hilbert curve is used, the number of subregions are related to an order D of the Hilbert curve according to Equation 2 given later in this specification.

In step 27, each agent locates itself on the space-filling curve. Each agent computes the subregion it is currently within by quantizing its position relative to the overall search area by converting from n-space to a 1-dimensional position along a space-filling curve. Algorithms such as Bially's can be used to convert from a relative n-space position to a one-dimensional Hilbert/space-filling curve position. Once the agent knows the subregion it is within, it moves and positions itself in the center of its current subregion according to the space-filling curve. The maximum distance any robot agent can be required to move in a square geographical search area is $s/\sqrt{2}$, where s is the size of a subregion square measured along a side.

In FIG. 2, steps 28 and 29 are performed as part of the searcher. In step 28, each agent searches for targets along the space-filling curve until a termination condition can be met. For example, each agent can proceed to each subregion in turn along the Hilbert curve, using the algorithm given in Table 1 later in this specification. At each subregion, the agent senses any targets of interest and checks to see if its next subregion is the starting subregion of any other agent. As discussed above for terminator indicator 15, in a single agent embodiment, the single agent can search until it returns to its initial position. In a multiple search agent embodiment, each agent searches until reaching the initial position for a preceding agent, its own starting position, or another specified position.

Once each agent has successfully completed its portion of the exhaustive search, it communicates an "all done" signal. If the search is a looking type of search, the agent also can communicate search output on targets it found, step 29. Search output includes number and locations of all targets found and any additional target information or features. The communication can be broadcast to all other search agents or sent to a search coordinator. In lieu of or in addition to reporting search results, each agent can take some other action, such as destroying the target or keeping it under surveillance. Agents can communicate prior to search completion, for example, to indicate location of a target, partial search completion, encounter with a malevolent robot, mobility difficulty, and other status conditions.

Each agent continues searching along the space-filling curve if its preceding agent has not communicated an "all done" signal after some reasonable time, step 30. If an agent fails for any reason, the search agent that follows it can autonomously decide to continue on the preceding agent's mission along the same path. Failure includes: death of an agent, agent communication failure and inability to send an "all done" signal, and any other failure to successfully communicate a successful search completion. As long as one agent remains operational, the search can complete. Each agent can precompute its own expected time to complete its portion of the search, since it knows at the outset how much of the curve it can expect to traverse. These completion times can be communicated to the collective agents and used as timeout values to detect fail-stop conditions. Agents can continue along the search path and can duplicately cover the path, for example, until a pre-determined time, a loss of energy or "death," a signal of completion by all agents, and other "all stop" indicators.

In lieu of communicating an "all done" signal, each agent can detect a marker or token dropped at the beginning or end of an immediate neighbor agent's path. The agent can use the token to know the limit of its own search area. In this example, a search can be performed without any broadcast communications.

Once all agents have completed their missions and have communicated their findings, the exhaustive search can be completed, step 31.

Expected Search Time

The time required to achieve guaranteed exhaustive coverage of the search region is bounded. At worst, the search takes time proportional to the number of subregions in the search region (or equivalently, the length of the space-filling curve). The precise upper bound time, $T_{UB}$, is calculated by multiplying the expected movement speed of a robot by s (the size of a subregion) by the total number of subregions. At best, the lower bound time is $T_{LB}=T_{UB}/m$, with m the number of robots. The expected exhaustive coverage time $T_E$ equals $T_{LB}$ when the robots are initially configured to be spaced equidistant from each other along the space-filling curve. If each robot starts at a random initial position, $T_E > T_{LB}$ but is not as large as $T_{UB}$.

A Monte Carlo simulation shows a reciprocal relationship between $T_E$ and number of robots. It shows that with 20 robots in random initial positions, the expected time to exhaust the space is less than 20% of the time required with 1 robot. This is not as good as the theoretical best case of $T_{LB}=5\%$, but can be acceptable for almost no initial configuration movement. With slightly more initial configuration movement, $T_E$ can come closer to $T_{LB}$. The nature of the particular space-filling curve being used becomes very important here. For the sake of simplicity, it can be assumed that no two robots initially occupy the same subregion. A resolution protocol, known in the art, or a heuristic (such as first to occupy the subregion) can deal with the possibility of co-location.

With the Hilbert curve, the search region is required to be divided into an integer power of 2 subregions (measured along a side). This can require the subregions to be significantly smaller than the sensor radius, thus increasing the overall distance traveled beyond that which would be required in the ideal case. Other curves which are not recursively subdivided by 2 but by other factors could remove this inefficiency, as could multi-level decomposition of the search region into macro- and micro-regions, where each type of region has a different coverage algorithm.

Geographic Search Tradeoffs

The following geographic search example using robots takes place in three phases: initial configuration, search, and terminal configuration. First, the robots organize themselves into a coherent, communicating group within the search region. They divide the area into subregions and assign each robot one or more subregions. Next, the search is conducted. Finally, the robots determine through consensus that the region has been searched. At this point, the robots take some terminal action.

To maximize efficiency, two tradeoff considerations can be considered:

1) Minimal Initial Configuration Energy

During initial configuration, the robots expend energy communicating with each other and moving into their initial positions. These energy expenditures can be minimized to improve efficiency.

2) Minimal Search Energy

During the search phase, the entire search area is covered in a finite time, preferably proportional to the reciprocal of the number of robots involved.

To optimize (1), the robots can perform no initial configuration at all, with each simply searching the area in its immediate vicinity. Initial communication and initial movement to coordinate with the other robots can be eliminated. The robots initially can be randomly distributed within the search region (for example, dropped out of an aircraft). Each robot can perform a random walk, spiral outward, or use some other autonomous algorithm. This defeats the purpose of multi-robot collaboration. Since there is no coordination, areas already searched can be retraced. Spiraling outward can guarantee that the search area is covered in a finite time, but using more than one robot cannot necessarily decrease that time. A random walk can be even worse—it cannot even guarantee coverage in a finite time.

Figure 3:
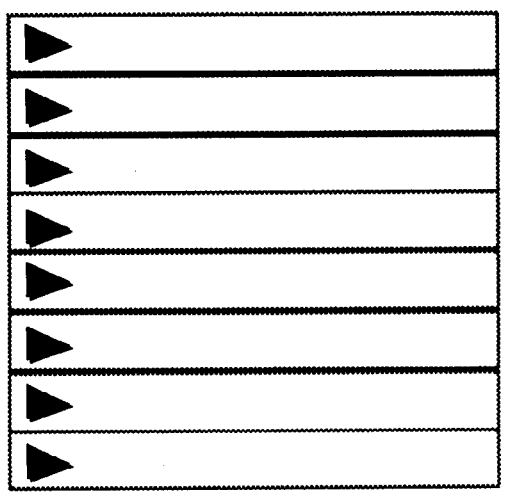
FIG. 3 is parallel search diagram showing robots (as triangles) aligned in preparation to march to the right.
Figure 4:
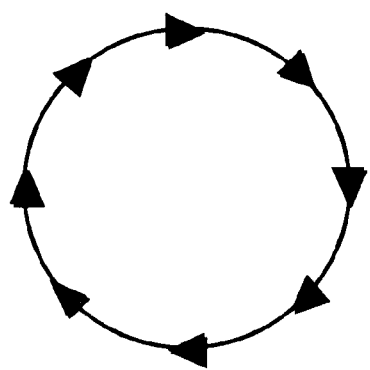
FIG. 4 is clockwise circle search diagram showing multiple agents.

In optimizing (2), the robots can subdivide the search area equally and each robot can search its agreed-upon subregion. A good deal of initial collaboration and movement can be needed here, especially if the robots start in random locations and move to an organized initial configuration. An example of such an initial configuration is shown in FIG. 3, where eight robots (triangles) have lined up in a column along the left side of the search region and plan to march to the right. Each search subregion is a horizontal strip. This can be a maximally-efficient search, but at the cost of a less efficient initial configuration. In addition, this search assumes all the robots are highly reliable; it cannot be robust if one or more robots dies during the search.

The dilemma is thus to find the optimal tradeoff between the initial configuration phase and the search phase that makes both acceptably efficient, while ensuring the robustness of the mission. Searching along a space-filling curve can solve the dilemma by requiring very little initial configuration while providing an efficient, robust search.

Hilbert Family of Space-Filling Curves

Figure 5:
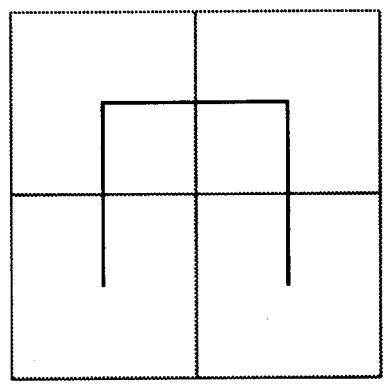
FIG. 5 is a graph showing a first order Hilbert curve.
Figure 6:
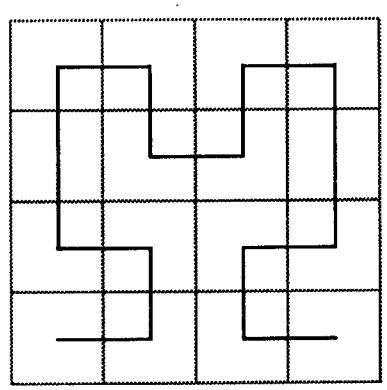
FIG. 6 is a graph showing a second order Hilbert curve.
Figure 7:
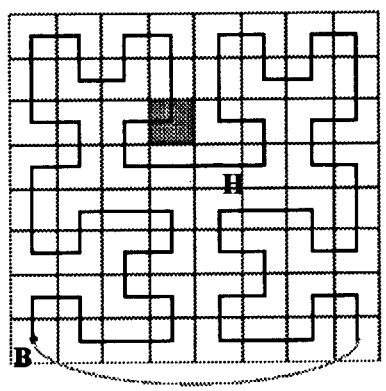
FIG. 7 is a graph showing an order 3 Hilbert curve.

Hilbert curves can be constructed to fill regions of any dimensionality. A two-dimensional region, corresponding to a geographic area on the surface of the earth is relatively easy to illustrate. However, the constructions and algorithms described herein can easily be extended to regions of more dimensions. A true space-filling curve is an ideal mathematical entity and can only be approximated in the real world. By dividing a region of interest into subregions of finite size, rather than points, a curve can be drawn which passes through each subregion. In FIG. 5, for example, a square region is divided into four subregions. The dark inverted U-shaped curve passes through the center of each subregion. Subdividing further, into 16 regions in a 4×4 grid, the curve becomes as in FIG. 6. Subdividing still further, into an 8×8 grid, FIG. 7 shows a curve which passes through each of the 64 subregions.

There are many families of space-filling curves. The example family of curves illustrated in FIGS. 5–7 is called the Hilbert curve, and has some useful properties. For example, two points that are "close" in two-dimensional space are more likely to be "close" in Hilbert space than with other space-filling curves. See Faloutsos and Roseman. The Hilbert curve is geometrically self-similar: every deeper subdivision of the curve contains four copies of the entire previous curve, suitably rotated and reflected, with some straight segments added to ensure continuity. The order of the Hilbert curve, denoted D, determines the number of subregions it passes through and consequently, the total length of the Hilbert curve can be computed according to:

$$\text{\# subregions} = (2^D)^2 = 2^{2D} = \text{Length}_{curve} + 1. \qquad \text{Equation 2}$$

Hilbert order D can be determined from search area size/subregion size, and the search region is required to be divided into an integer power of 2 subregions (measured along a side).

FIG. 5 is a first order curve, where D=1, because it occupies 4 subregions and is 3 units long. FIG. 6 has D=2, and FIG. 7 has D=3. (To visit every point in a region, a curve would have to have order D=∞.)

The Hilbert curve is a geometrically self-similar fractal and can have a recursive algorithm for its computation. However, there is also a non-recursive algorithm for computing a given Hilbert curve which is more useful in a robotic search application. Identifying a particular subregion of a Hilbert-traversed space (for example, the shaded subregion in FIG. 7) can be done in two different ways: by specifying its [x,y] location as [3,5] (where [0,0] specifies the lower left corner subregion marked with the letter B in the figure), or by specifying its position along the Hilbert curve as the scalar value 28, which indicates that it is the $28^{th}$ subregion encountered along the curve measuring from the beginning of the curve at subregion B. Subregion B is location 0 in the frame of reference used in FIG. 7.

Search Along a Space-Filling Curve

A straightforward algorithm exists to convert 2-space coordinates of real space into a 1-space Hilbert coordinate and an equally simple algorithm to convert from 1-space back into 2-space. See Bially. Even though the dimensionality changes during this conversion, no information is lost because the total number of possible bits in x or y is D, while the total number of bits needed to specify the 1-space Hilbert coordinate is 2D. The conversion algorithms merely interpret the coordinate bits in different ways.

Using 1-space to 2-space conversion algorithms can simplify programming a robot to follow a space-filling curve. If the robot can deduce its current x,y location (via Global Positioning Satellite, inertial sensors, etc.), the algorithm can be as shown in Table 1:

$x_0, y_0 \leftarrow$ current location $H \leftarrow$ Convert $x_0, y_0$ to Hilbert $H \leftarrow H+1$ (increment position along Hilbert curve)

$x_1, y_1 \leftarrow$ Convert $H$ to agent's new location $x_1, y_1$

Table 1: Hilbert traversal algorithm.

In practice, the operation $H \leftarrow H+1$ is performed modulo $2^{2D}$, which causes the robot to return to the beginning point of the curve after it reaches the end. This closes the curve and make it a topological circle instead of a line segment. The gray curved arc at the bottom of FIG. 7 reflects this closing. Table 1 shows an embodiment using a Hilbert curve and increments by one position along the Hilbert curve. A different embodiment can use another space-filling curve and can increment the position along the curve by any integer, positive or negative.

By giving the robot a sensing mechanism whose sensory range is at least as large as a single subregion, the robot can traverse the curve and search the overall region in time proportional to the number of subregions, $2^{2D}$. The algorithm works regardless of where on the curve the robot starts; it need not start at the H=0 point of the curve. One reason the recursive algorithm is not used in the robotic application is that it can be difficult to initialize the recursive control stack properly to allow traversal to begin at an arbitrary point. Starting at an arbitrary point becomes valuable when more than one robot is involved. With two robots, one can start at the beginning of the curve (point B in FIG. 7) and the other can start at the halfway point of the curve (point H in FIG. 7). Thus, the resulting traversal of the curve can take place in half the time it would take with one robot. In general, with m robots, the space can be searched in time proportional to $2^{2D}/m$, if the robots can be initially spaced equally along the curve.

Example Using Robotic Vehicles

The present invention utilizes a space-filling curve to provide exhaustive coverage of a search area. In the following example embodiment, a Hilbert curve is used as a space-filling curve to identify a search path to search an area in space thoroughly. Multiple miniature robots are dropped at random in a field in order to search the field for mines, or some other set of objects detectable by sensors located on each robot. A search goal is to search every physical ground position. The robots are semi-autonomous and cooperating.

1. Each robot establishes its initial position and lets other robots (in an embodiment with more than one robot) know its position. Coordination is accomplished by the robots sharing their initial positions (initial configuration).
2. Each robot sub-divides the search area.
3. Each robot generates a path according to a Hilbert space-filling curve.
4. Each robot generates and follows the same Hilbert curve.
5. Each robot follows the generated path until a termination condition is met. An example termination condition for an embodiment with one robot is that robot's initial starting position. An example termination condition for an embodiment with multiple robots includes the robot's starting position, a preceding neighbor robot's initial starting condition, and any identified position.
6. Exhaustive search is accomplished by each robot searching along a path according to an identical space-filling curve and proceeding up to the starting point of a preceding robot. If any robot "dies" or cannot report in at the end of the search, the robot immediately following (along the same path) continues on the path until it reaches the starting-initial-position for a robot that can report a successful termination condition.
7. When the termination condition is met, a robot communicates an "all done" signal.

Example Using Software Agents

In the following example embodiment using software agents, a space-filling curve is used to search an area in cyberspace thoroughly. The cyberspace can be a network of one or more computers, a computer-memory or storage space, and any area searchable by a computing resource.

In searching a cyberspace, cyberspace addresses can be treated as multi-dimensional coordinates and can be converted back and forth to one-dimensional space-filling curve space to derive the next cyberspace address. A space-filling curve can be used in an alternate cyber example to determine load balancing for several search agents without need for further communication. Space-filling curves can efficiently divide the labor for searching an un-indexed cyberspace (which does not necessarily represent geographic data) among multiple agents.

If a search is to be performed over a range of cyberspace addresses, a non-space-filling-curve approach can be used to partition the address space equally among the search agents as done in FIG. 3 for multiple robot agents. Since information is not necessarily distributed evenly over the range of IP addresses, some software agents can have very little space to search while other software agents can be required to search a large chunk of the IP address space. A space-filling curve as in the present invention can be used to map a multi-dimensional IP address space (for example, with addresses from 0 to a large hexadecimal number such as FFFFFFFF) to a space-filling curve. A controlled scrambling of the IP addresses, as with a space-filling curve algorithm, can provide a new division of labor among the software agents.

In a computer-space, exhaustive search can be defined to be a specified search depth or a specified depth of links to follow. For example, in an exhaustive cyberspace search, each agent can traverse all links through N-levels but not all cyberspace addresses. A starting point can be used to generate a set of search links to follow. Each link can be used to generate another set of links to follow at another depth-level, continuing until a specified number of levels have been searched.

With a controlled scrambling of the IP addresses for a division of labor, more than one agent can encounter a link to the same IP address. Since each agent can be assigned a specific range of IP addresses, any generated link not in that agent's IP range can be logged and then passed on to the appropriate agent responsible for searching that particular IP range, avoiding the inefficiency of multiple agents searching the same address.

"Death" of a software agent can include a loop or any situation from which the agent cannot proceed. If a software agent dies, another agent can search the dead agent's search space or each agent can follow any generated links that fall in the dead agent's IP range.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A distributed search system for controlling two or more agents to exhaustively search an area in parallel as a coordinated, coherent communicating group, wherein the distributed search system comprises an agent search system associated with each agent, and wherein each agent search system comprises:
   a) a locator, in communication with the agent;
   b) a search controller, responsive to the locator and generating an exhaustive search pattern for the search area comprising a space-filling curve along which the agent travels; and
   c) means for communicating information with other agents.

2. The distributed search system of claim 1, wherein the space-filling curve comprises a Hilbert curve.

3. The distributed search system of claim 1, wherein the search area comprises a physical geography, and wherein each agent comprises a robot.

4. The distributed search system of claim 3, wherein said means for communicating comprises one or more communication means selected from the group consisting of means for dropping a marker or token and means for detecting a marker or token.

5. The distributed search system of claim 1, wherein the locator of each agent search system comprises a position identifier and a target sensor.

6. The distributed search system of claim 5, wherein the position identifier of each agent search system's locator is selected from the group consisting of: inertial sensors, inertial position units, global positioning systems, initial position identifiers, dead-reckoning, cyberspace addresses, IP addresses, and combinations thereof.

7. The distributed search system of claim 1, wherein the search area comprises a cyberspace search area.

8. The distributed search system of claim 1, wherein the search controller of each agent search system comprises:
  a) a computer, responsive to the locator,
  b) a communicator, accessible from the computer and communicating an initial position for the agent; and
  c) a program implementing the exhaustive search pattern on the computer.

9. The distributed search system of claim 1, wherein the search controller of each agent search system comprises:
  a) an initalizer, responsive to the locator;
  b) a searcher, generating the exhaustive search pattern; and
  c) a terminator, indicating a termination condition for the search controller.

10. The distributed search system of claim 9, wherein the initializer of each agent search system's controller comprises;
  a) means for determining an initial position for the agent, indicated by the locator; and
  b) means for determining an identified extrema position of the search area.

11. The distributed search system of claim 10, wherein each agent has an associated agent coverage size, and wherein the initializer of each agent search system's controller further comprises a search pattern parameter, determined from the identified extrema position and the agent coverage size.

12. The distributed search system of claim 1, wherein each agent searches along the same space-filling curve.

13. A computer-implemented method for controlling two or more agents to exhaustively search an area as a coordinated, coherent communicating group, wherein each agent comprises a locator and a search controller, wherein the method, for each agent, acting in parallel with the other agents, comprises:
  a) determining a characteristic of the agent from the locator;
  b) searching the search area, according to a space-filling curve and the characteristic;
  c) communicating information with other agents; and
  d) terminating the search controller, according to a termination condition.

14. The method of claim 13,
  a) wherein the characteristic comprises:
    i) an initial position for the agent; and
    ii) an extreme position of the search area;
  b) and the method further comprises communicating the initial position with other agents in the two or more agents.

15. The method of claim 14, wherein each agent has an associated agent coverage size, the method further comprising generating a search pattern parameter, determined from the extreme position and the agent coverage size, and indicative of the space-filling curve.

16. The method of claim 13, wherein the termination condition comprises a current agent position selected from the group consisting of: an initial position for a preceding agent, a terminal position for a follower agent, initial position for the agent, a position along the space-filling curve, and combinations thereof.

17. The method of claim 13, wherein searching the search area comprises:
  a) transforming a current position in a multi-dimensional space to a one-dimensional position along the space-filling curve;
  b) incrementing the position along the space-filling curve; and
  c) transforming the incremented position along the space-filling curve to a successor position in the multi-dimensional space.

18. The method of claim 13, wherein the two or more agents are selected from the group consisting of: robots, cyberspace agents, software agents, search agents, coverage agents, and combinations thereof.

19. The method of claim 13, wherein communicating information with other agents comprises performing one or more tasks selected from the group consisting of dropping a marker or token and detecting a marker or token dropped at the beginning or end of an immediate neighbor agent's path to communicate an "all done" signal without performing any broadcast communications.

20. A computer-implemented method for controlling two or more agents to exhaustively search an area in parallel as a coordinated, coherent communicating group, wherein each agent comprises a locator and a search controller; wherein the method, for each agent, comprises:
  a) locating its initial position;
  b) computing a subregion size;
  c) communicating its initial position with other agents;
  d) determining extrema position of the search area if not already known;
  e) determining self-position in search area;
  f) determining search parameters based on the search area and subregion size;
  g) determining number of subregions and length of a space-filling curve;
  h) locating self on the space-filling curve;
  i) searching along the space-filling curve until a termination condition is met;
  j) communicating an "all done" signal and communicating search output;
  k) continuing to search along the space-filling curve if its preceding agent has not communicated an "all done" signal; and
  l) repeating steps i) through k) until an exhaustive search has been completed.

21. The method of claim 20, wherein the number of subregions in the search area is related to the length of the space-filling curve, $Length_{curve}$, according to:

$$\# \text{subregions} = (2^D)^2 = 2^{2D} = Length_{curve} + 1;$$

where D is the order of the space-filling curve.

22. The method of claim 20, wherein the space-filling curve comprises a Hilbert curve.

23. The method of claim 20, wherein the search area comprises a physical geography, and each agent comprises a robot.

24. The method of claim 23, wherein searching comprises traveling through the search area and leaving or removing something.

25. The method of claim 24, wherein leaving or removing something comprises performing one or more tasks selected from the group consisting of: applying paint or fertilizer to a surface, mowing a lawn, maintaining a golf course, cleaning a swimming pool, and moving or clearing earth.

* * * * *